(12) United States Patent
Yoshijima et al.

(10) Patent No.: US 7,789,056 B2
(45) Date of Patent: Sep. 7, 2010

(54) SLEEVE AND CYLINDER HEAD COVER

(75) Inventors: Kazuya Yoshijima, Okazaki (JP); Naohiro Hasegawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 523 days.

(21) Appl. No.: 11/794,141

(22) PCT Filed: Jan. 16, 2006

(86) PCT No.: PCT/JP2006/300430

§ 371 (c)(1), (2), (4) Date: Jun. 26, 2007

(87) PCT Pub. No.: WO2006/077788

PCT Pub. Date: Jul. 27, 2006

(65) Prior Publication Data

US 2008/0088095 A1  Apr. 17, 2008

(30) Foreign Application Priority Data

Jan. 18, 2005  (JP) ............................ 2005-010910

(51) Int. Cl.
  *F01M 9/10*  (2006.01)
(52) U.S. Cl. .............. 123/90.38; 123/90.12; 123/90.33; 123/193.5; 277/607

(58) Field of Classification Search ............... 123/90.12, 123/90.13, 90.38, 90.33, 193.3, 193.5, 195 C, 123/198 E; 277/591, 596, 607
See application file for complete search history.

(56) References Cited

U.S. PATENT DOCUMENTS

| 7,594,488 B2 * | 9/2009 | Yoshijima et al. ........ 123/90.38 |
| 2002/0026914 A1 | 3/2002 | Maeyama et al. |
| 2003/0145814 A1 | 8/2003 | Inoue |
| 2004/0007193 A1 | 1/2004 | Dietz |

FOREIGN PATENT DOCUMENTS

| JP | 11-132016 A | 5/1999 |
| JP | 2000-130115 A | 5/2000 |
| JP | 2002-242616 A | 8/2002 |
| JP | 2003-227321 A | 8/2003 |

* cited by examiner

*Primary Examiner*—Ching Chang
(74) *Attorney, Agent, or Firm*—Kenyon & Kenyon LLP

(57) ABSTRACT

A sleeve allows insertion of an oil control valve, and is used by being inserted to an installation hole provided in a cylinder head cover. An outer surface of a sleeve main body of the sleeve is covered by a rubber-like elastic body layer. The rubber-like elastic body layer has a protrusion provided in the periphery of an oil hole provided in the sleeve main body in such a manner as to surround the oil hole. In accordance with the sleeve, it is possible to install the oil control valve to the cylinder head cover at a high oil tightness.

18 Claims, 10 Drawing Sheets

SLEEVE AND CYLINDER HEAD COVER

This is a 371 national phase application of PCT/JP2006/300430 filed 16 Jan. 2006, claiming priority to Japanese Patent Application No. 2005-010910 filed 18 Jan. 2005, the contents of which are incorporated herein by reference.

FIELD OF THE INVENTION

The present invention relates to a sleeve allowing insertion of an oil control valve (OCV) and being inserted, when used, to an installation hole provided in a cylinder head cover. The present invention also relates to a cylinder head cover to which the sleeve is installed.

BACKGROUND OF THE INVENTION

In the case that a hydraulically operated variable valve actuation mechanism is provided in a timing sprocket, a timing pulley or the like of an internal combustion engine, a hydraulic oil supply and drain oil passage connecting an oil control valve with the variable valve actuation mechanism is generally provided so as to pass through a camshaft. In this case, there has been proposed a structure in which the oil control valve is installed to the cylinder head cover, and the hydraulic oil is supplied and drained via the oil passage within the cam cap and the camshaft by the oil control valve (for example, refer to patent document 1).

In order to install the oil control valve to the cylinder head cover, it is necessary to form an installation hole in the cylinder head cover. For example, in the case that the installation hole is bored in the cylinder head cover cast from a metal, there is a risk that a cast defect in an inner portion of the cylinder head cover is exposed to a surface defining the installation hole. If the cast defect is exposed to the surface defining the installation hole, an oil tightness between the oil control valve inserted to the installation hole and the surface defining the installation hole is lowered, and a problem is generated in a hydraulic control.

The problem mentioned above may be generated in the same manner in the case that the cylinder head cover is formed of a resin. In the case of the resin cylinder head cover, the oil tightness between the surface defining the installation hole and the oil control valve is further lowered due to a poorness of a dimensional accuracy of the installation hole, a difference of thermal expansion rate between the oil control valve and the cylinder head cover, a creep phenomenon or the like.

Patent Document 1: Japanese Patent Publication No. 3525709

SUMMARY OF THE INVENTION

Accordingly, it is an objective of the present invention to allow an oil control valve to be installed to a cylinder head cover at a high oil tightness.

In order to achieve the object mentioned above, the present invention provides the following sleeve. The sleeve allows insertion of the oil control valve, and being inserted, when used, to an installation hole provided in the cylinder head cover. The sleeve is provided with a tubular sleeve main body, an oil hole, and a rubber-like elastic body layer. The sleeve main body has an outer surface having a shape corresponding to a shape of a surface defining the installation hole, and has an inner surface having a shape corresponding to an outer surface of the oil control valve. The oil hole is provided in the sleeve main body so as to connect an internal space of the sleeve with an outside of the sleeve in such a manner as to supply and drain a hydraulic oil between the oil control valve and an oil passage provided in the cylinder head cover. The rubber-like elastic body layer is provided in such a manner as to cover the outer surface of the sleeve main body. The rubber-like elastic body layer has a protrusion provided in the periphery of the oil hole in such a manner as to surround the oil hole.

The present invention also provides the following cylinder head cover of an internal combustion engine. The cylinder head cover has an installation hole, and the sleeve mentioned above is arranged in the installation hole.

DETAILED DESCRIPTION OF THE PREFERRED EMBODIMENTS

A description will be given of a first embodiment in accordance with the present invention with reference to FIGS. 1 to 6.

Figure 1:
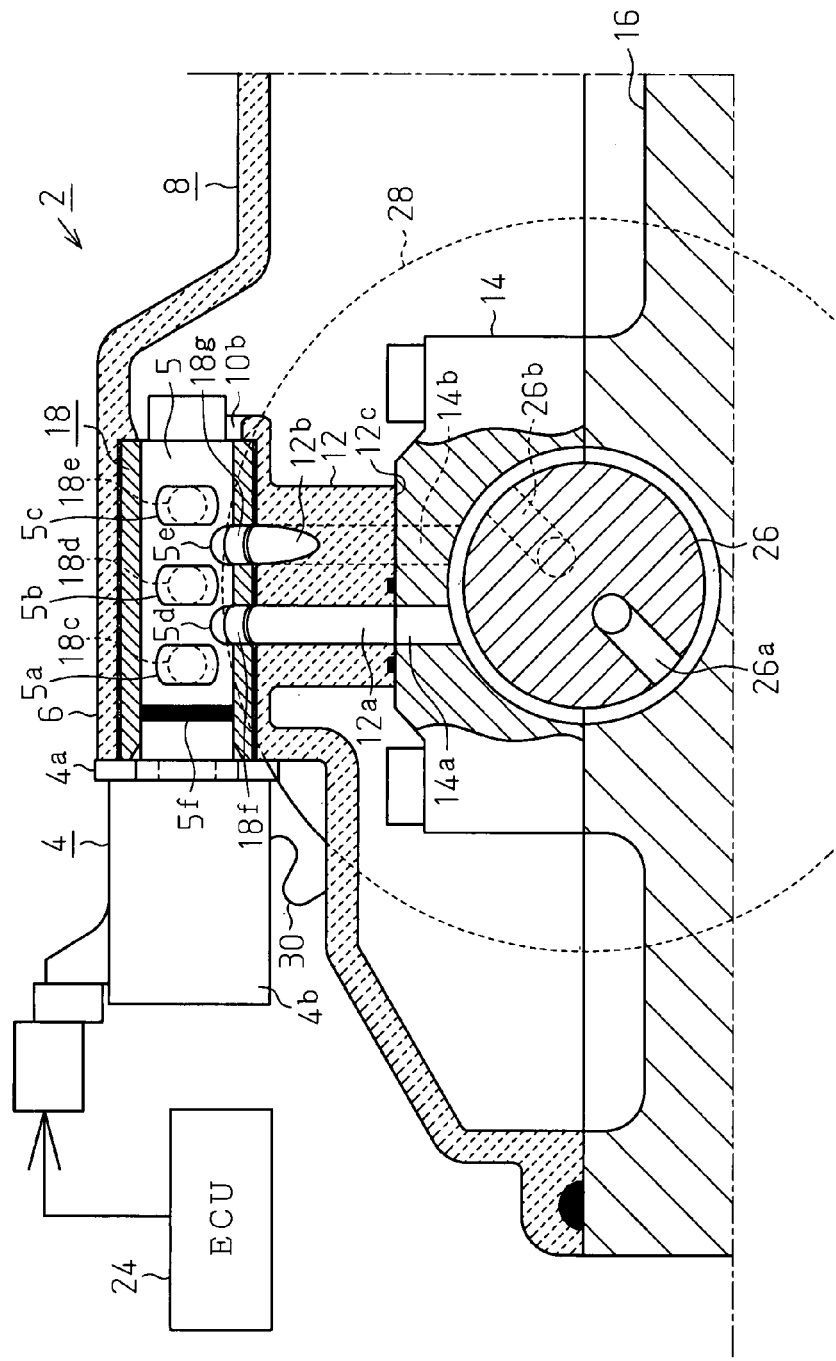
FIG. 1 is a longitudinal cross-sectional view of a portion around an installation portion in a cylinder head cover in accordance with a first embodiment of the present invention.

A cover main body 8 of a cylinder head cover 2 for an engine in accordance with the first embodiment shown in FIG. 1 is cast from metal. The cover main body 8 includes an installation portion 6 to which an oil control valve (OCV) 4 is installed. The installation portion 6 is provided with a cylindrical installation hole 10 shown in FIG. 3 and formed at a time of casting the cover main body 8. The installation hole 10 may be finished by cutting or grinding as necessary after casting the cover main body 8.

An outer end 10*a* of the installation hole 10 is open to an outside of the cover main body 8, and an inner end of the installation hole 10 is open to an inner side of the cover main body 8. A ring-shaped locking protrusion 10*b* is provided in a peripheral edge of the inner end of the installation hole 10.

An oil passage connection portion 12 is provided below the installation hole 10. Two connection oil passages 12*a* and 12*b* are provided within the oil passage connection portion 12. Upper ends of the connection oil passages 12*a* and 12*b* are open to a surface defining the installation hole 10. Lower ends of the connection oil passages 12*a* and 12*b* are open to a contact surface 12*c* brought into contact with a cam cap 14. In a state in which the cylinder head cover 2 is attached to a cylinder head 16, cam cap oil passages 14*a* and 14*b* provided in the cam cap 14 respectively communicate with the connection oil passages 12*a* and 12*b*.

Figure 2:
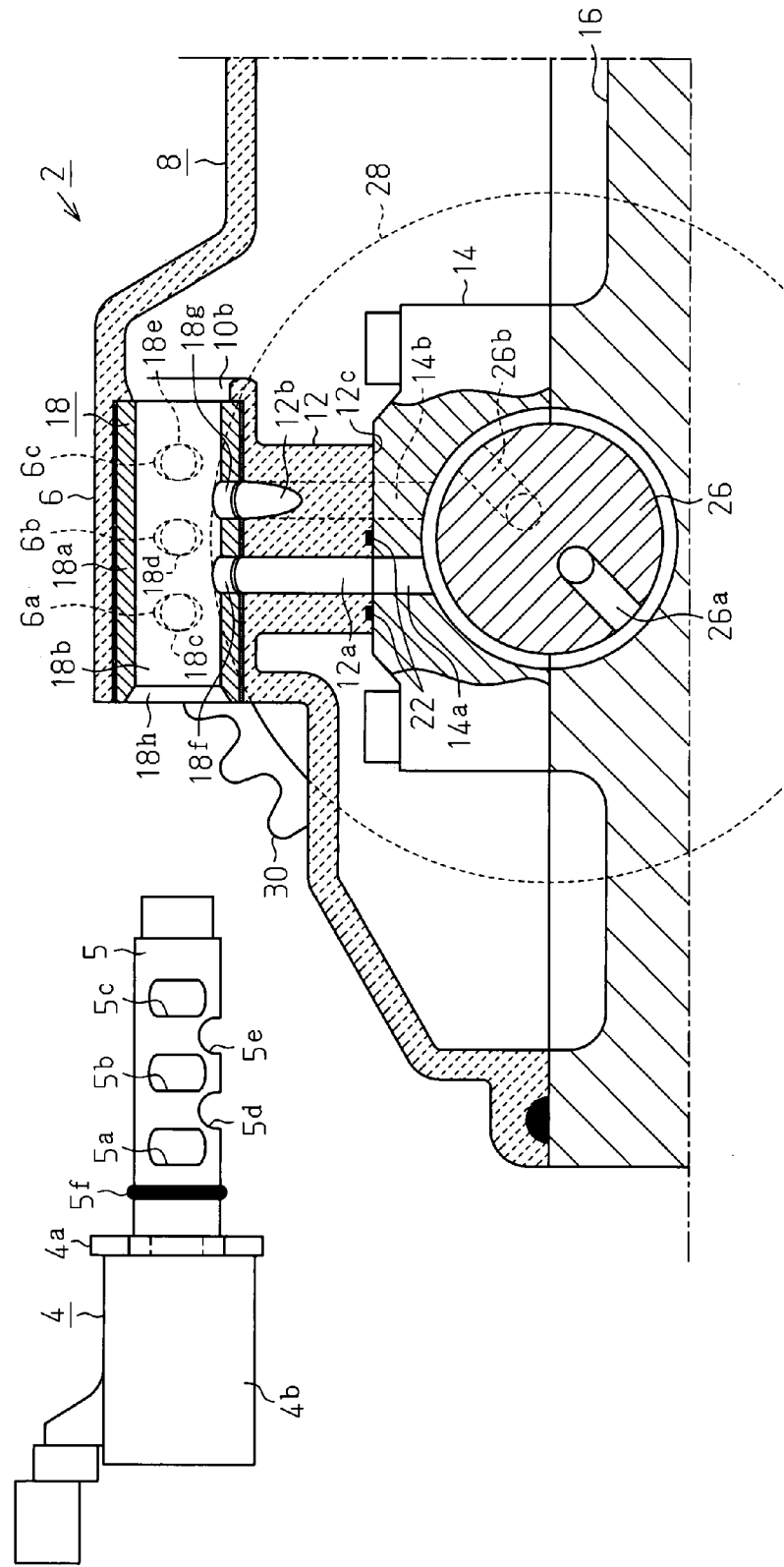
FIG. 2 is a longitudinal cross-sectional view showing the portion around the installation portion of the cylinder head cover in FIG. 1 before an OCV is installed, together with the OCV.
Figure 3:
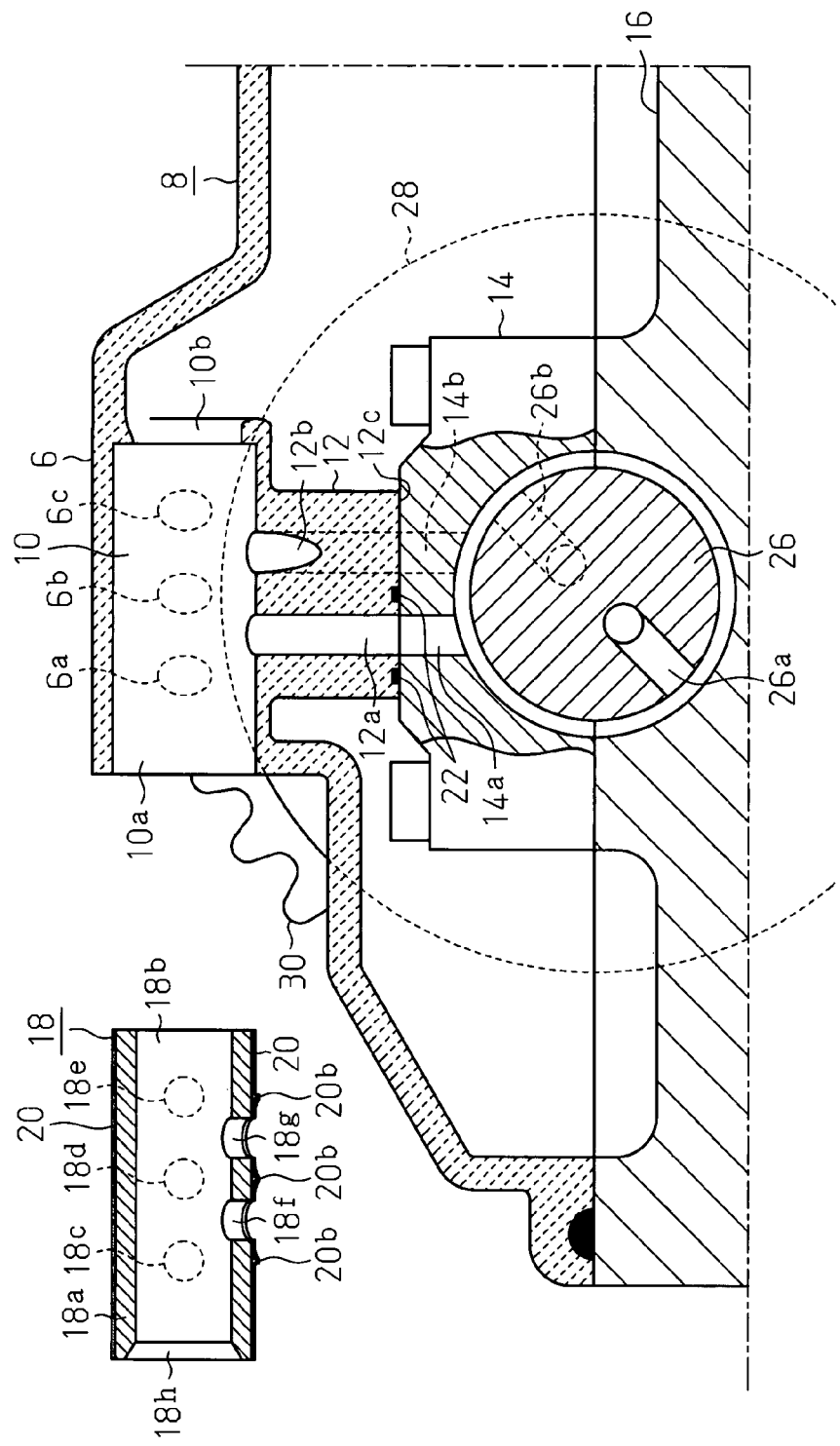
FIG. 3 is a longitudinal cross-sectional view showing the portion around the installation portion of the cylinder head cover in FIG. 1 before an OCV and a sleeve are installed, together with the sleeve.

Oil passages 6*a*, 6*b* and 6*c* are provided in the installation portion 6. The oil passages 6*a* to 6*c* extend orthogonal to an extending direction of the connection oil passages 12*a* and 12*b*, and have end portions open to the surface defining the installation hole 10. In FIGS. 2 and 3, since the oil passages 6*a* to 6*c* are provided in a portion of the installation portion 6 in a cut side, the openings of the oil passages 6*a* to 6*c* are shown by broken lines.

The center oil passage (the supply oil passage) 6*b* is connected to a hydraulic oil supply passage (not shown) provided in the cylinder head 16 via a pipe, the other oil passage or the like. Accordingly, hydraulic oil is supplied into the installation hole 10 from the hydraulic oil supply passage via the supply oil passage 6*b*.

The oil passages (the drain oil passages) 6*a* and 6*c* in both sides have end portions open to an inner side of the cover main body 8, and the hydraulic oil within the installation hole 10 is drained to the inner side of the cover main body 8 via the drain oil passages 6*a* and 6*c*.

Figure 4:
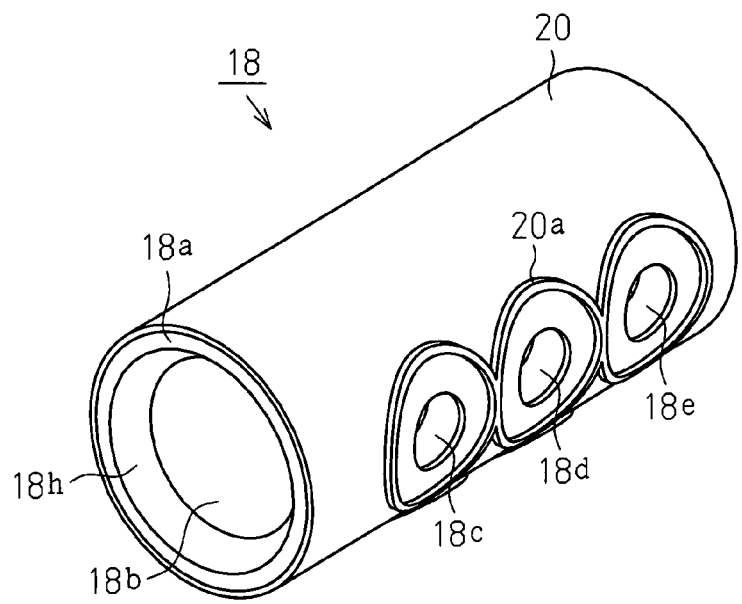
FIG. 4(A) and FIG. 4(B) are perspective views of a sleeve of the cylinder head cover in FIG. 1, in which view points are different at 90 degree from each other around an axis of the sleeve.
Figure 4:
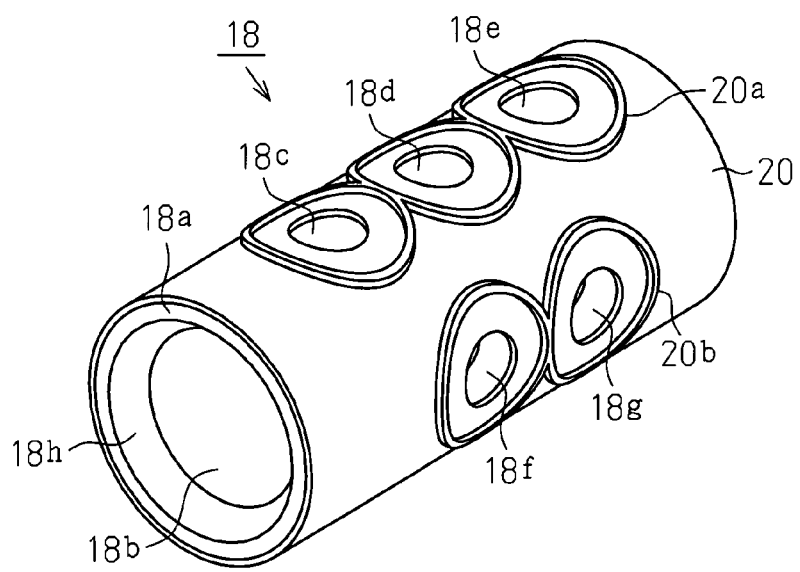
Figure 5:
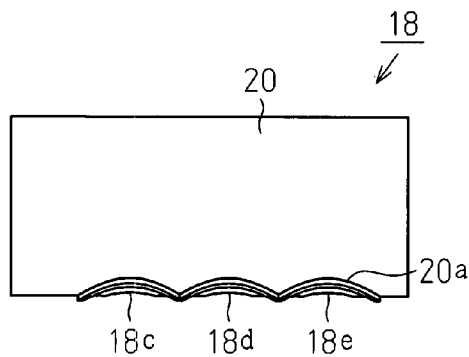
FIG. 5(A) is a plan view of the sleeve in FIG. 4(A) and FIG. 4(B)
FIG. 5(B) is a front view of the sleeve.
FIG. 5(C) is a bottom view of the sleeve.
FIG. 5(D) is a rear view of the sleeve.
FIG. 5(E) is a left side view of the sleeve.
FIG. 5(F) is a right side view of the sleeve.
Figure 5:
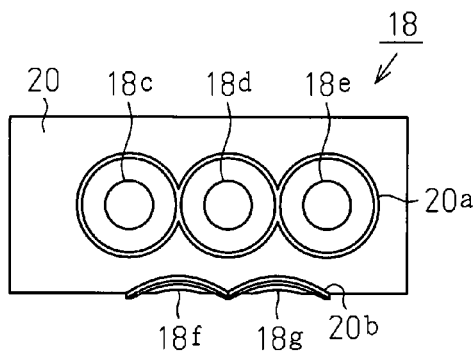
Figure 5:
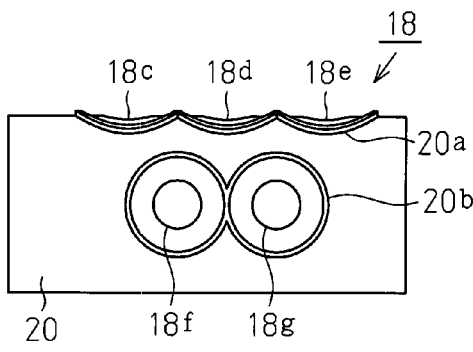
Figure 5:
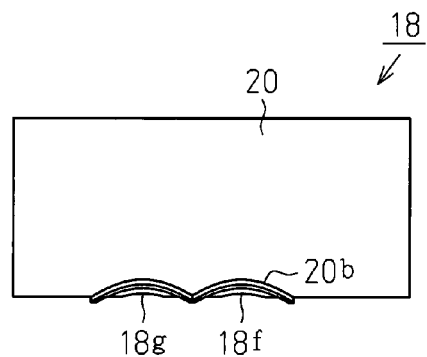
Figure 5:
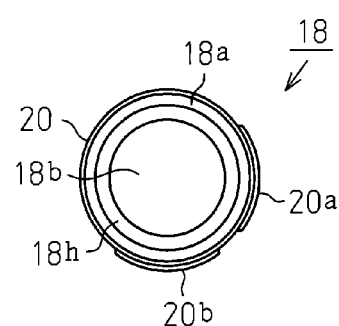
Figure 5:
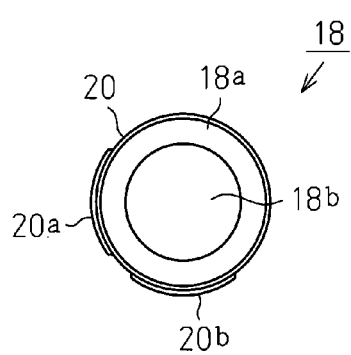
Figure 6:
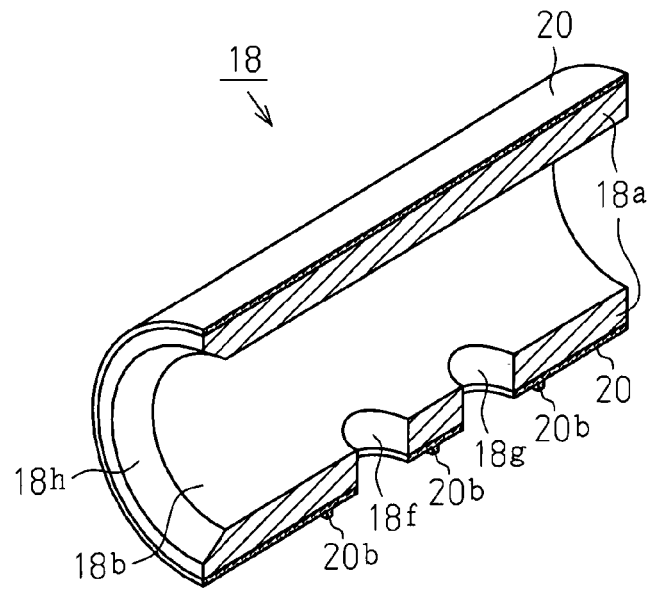
FIG. 6(A) is a broken perspective view at a vertical plane of the sleeve in the attitude in FIG. 4(A)
FIG. 6(B) is a broken perspective view at a vertical plane of the sleeve in the attitude in FIG. 4(B)
Figure 6:
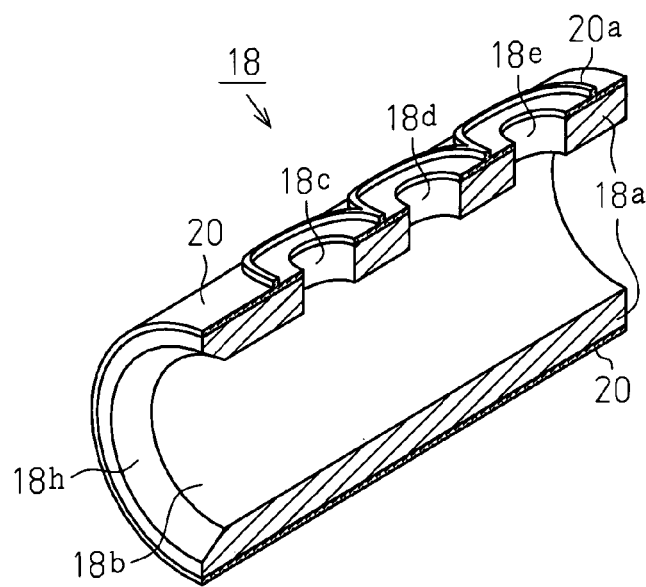

As shown in FIG. 2, a sleeve 18 is installed to the installation hole 10. As shown in FIGS. 4 to 6, the sleeve 18 has a cylindrical sleeve main body 18*a*. The sleeve main body 18*a* is formed of a metal material such as an aluminum alloy, or an iron alloy. The sleeve main body 18*a* may be formed of the same metal material as that of the spool housing 5 of the OCV 4 in FIGS. 1 and 2.

The sleeve main body 18*a* is provided with oil holes 18*c*, 18*d*, 18*e*, 18*f*, and 18*g* respectively corresponding to five ports 5*a*, 5*b*, 5*c*, 5*d* and 5*e* provided in the spool housing 5 of the OCV 4. The oil holes 18*c* to 18*g* connect an accommodation hole 18*b* corresponding to an internal space of the sleeve 18 with an outside of the sleeve 18. A tapered surface 18*h* is provided in an end portion of the sleeve main body 18*a* in the side to which the OCV 4 is inserted, for making it easy to insert the OCV 4 to the accommodation hole 18*b*. In FIGS. 1 to 3, since the oil holes 18*c*, 18*d* and 18*e* are provided in the portion of the sleeve 18 in the cut side, the oil holes 18*c*, 18*d* and 18*e* are shown by broken lines.

An outer circumferential surface of the sleeve main body 18*a* except the oil holes 18*c* to 18*g* is covered by a rubber-like elastic body layer 20 made of a rubber resin. The rubber-like elastic body layer 20 includes protrusions 20*a* and 20*b* corresponding to a thick portion provided around the oil holes 18*c* to 18*g* so as to surround the respective oil holes 18*c* to 18*g*.

The rubber-like elastic body layer 20 may be formed in the sleeve main body 18*a* by any method. For example, a liquid or a powder material, which turns into a rubber-like elastic body, may be used. In this case, such a liquid or a powder material is applied to the outer circumferential surface of the sleeve main body 18*a* by means of printing, dipping or the like, and thereafter baked. The protrusions 20*a* and 20*b* may be formed by applying the material thick in accordance with a method such as printing.

An outer diameter of the sleeve 18, in which the rubber-like elastic body layer 20 is formed on the outer circumferential surface of the sleeve main body 18*a* as mentioned above, is slightly larger than an inner diameter of the installation hole 10. Accordingly, the sleeve 18 is accommodated in the installation hole 10 in a state in which the rubber-like elastic body layer 20 is compressed along a radial direction of the sleeve 18. At this time, the protrusions 20*a* and 20*b* are compressed more strongly than the other portions of the rubber-like elastic body layer 20.

The cover main body 8 is fixed to the cylinder head 16 by being fastened by bolts or the like, before installing the OCV 4 to the sleeve 18 as shown in FIG. 2, or after installing the OCV 4 to the sleeve 18.

When attaching the cover main body 8 to the cylinder head 16, a substantially figure-of-eight seal ring 22 is previously arranged in a lower surface of the oil passage connection portion 12 in such a manner as to surround the openings of the connection oil passages 12*a* and 12*b* in the lower surface of the oil passage connection portion 12. The seal ring 22 serves as an oil seal function in a contact surface between the oil passage connection portion 12 and the cam cap 14.

The OCV 4 is installed to the installation portion 6 in a state in which the sleeve 18 is accommodated in the installation hole 10. That is, the spool housing 5 of the OCV 4 is installed to the accommodation hole 18*b* of the sleeve 18. Accordingly, a structure shown in FIG. 1 is completed.

The sleeve main body 18*a* is made of a metal material, and the accommodation hole 18*b* of the sleeve 18 is formed at a high accuracy in such a manner that a predetermined clearance is secured between a surface defining the accommodation hole 18*b* and the spool housing 5. Accordingly, even if a cast defect of the cover main body 8 appears on the surface defining the installation hole 10, the oil tightness between the OCV 4 and the sleeve 18 is reliably maintained by an O-ring 5*f* provided in a proximal end portion of the spool housing 5.

Further, the outer circumferential surface of the sleeve 18 is constituted by the rubber-like elastic body layer 20, and each of the oil holes 18*c* to 18*g* is surrounded by the protrusions 20*a* and 20*b* extending over the entire circumference. Accordingly, even if the cast defect appears on the surface defining the installation hole 10, it is possible to reliably maintain the oil tightness between the sleeve 18 and the surface defining the installation hole 10.

Therefore, in accordance with the present embodiment, even if the cast defect appears on the surface defining the installation hole 10, it is possible to install the OCV 4 to the cylinder head cover 2 at a high oil tightness.

The OCV 4 is provided with a bracket 4*a*. The OCV 4 is prevented from coming off and is prevented from rotating by fastening the bracket 4*a* to the cover main body 8 by a bolt after inserting the spool housing 5 to the accommodation hole 18*b* of the sleeve 18.

An electronic control unit (ECU) 24 shown in FIG. 1 controls an exciting current applied to an electromagnetic solenoid portion 4*b* of the OCV 4 in correspondence to an operating state of the engine. Accordingly, the hydraulic oil supplied to a port 5*b* of the spool housing 5 via the supply oil passage 6b and the oil hole 18d is supplied to one of the oil holes 18f and 18g through the ports 5d and 5e and is drained from the other. The supply and drain of the hydraulic oil is executed with respect to a variable valve actuation mechanism 28 via the connection oil passages 12a and 12b, the cam cap oil passages 14a and 14b, and two oil passages 26a and 27b provided within a camshaft 26. For example, when the hydraulic oil is supplied to the variable valve actuation mechanism 28 via the connection oil passage 12a, the cam cap oil passage 14a, and the oil passage 26a, and the hydraulic oil is drained from the variable valve actuation mechanism 28 via the connection oil passage 12b, the cam cap oil passage 14b, and the oil passage 26b, the variable valve actuation mechanism 28 is controlled to retard the phase. As a result, the phase of the camshaft 26 is retarded with respect to a timing sprocket 30 and a valve timing is retarded. In contrast, when the hydraulic oil is supplied to the variable valve actuation mechanism 28 via the connection oil passage 12b, the cam cap oil passage 14b, and the oil passage 26b, and the hydraulic oil is drained from the variable valve actuation mechanism 28 via the connection oil passage 12a, the cam cap oil passage 14a and the oil passage 26a, the variable valve actuation mechanism 28 is controlled to advance the phase. As a result, the phase of the camshaft 26 is advanced with respect to the timing sprocket 30 and the valve timing is advanced.

In accordance with the first embodiment described above, the following advantages are obtained.

The sleeve main body 18a of the sleeve 18 has an outer surface having a shape corresponding to a shape of the surface defining the installation hole 10, and has an inner surface having a shape corresponding to an outer surface of the OCV 4, particularly to an outer surface of the spool housing 5. Since the shape of the sleeve main body 18a is comparatively simple, for the matter of that the sleeve main body 18a is made of the metal, it is possible to easily obtain the structure having no defect and having a high dimensional accuracy. Accordingly, the oil tightness between the sleeve main body 18a and the OCV 4 is high.

An outer circumferential surface of the sleeve main body 18a is covered by a rubber-like elastic body layer 20 made of a rubber resin. Even if the cast defect is generated in the cover main body 8, particularly in the installation portion 6 having a complicated shape, and the defect appears on the surface defining the installation hole 10, the rubber-like elastic body layer 20 is deformed in such a manner as to fill a gap generated between the surface defining the installation hole 10 and the sleeve 18 due to the defect, whereby it is possible to achieve an oil tightness between the surface defining the installation hole 10 and the sleeve 18. Further, even if the dimensional accuracy of the installation hole 10 is low, and a difference of thermal expansion rate between the OCV 4 and the cover main body 8 exists, the rubber-like elastic body layer 20 is deformed in such a manner as to fill the gap generated between the surface defining the installation hole 10 and the sleeve 18, whereby it is possible to achieve the oil tightness between the surface defining the installation hole 10 and the sleeve 18.

Each of the oil holes 18c to 18g of the sleeve 18 is surrounded by the protrusions 20a and 20b. Accordingly, the seal between the surface defining the installation hole 10 and the sleeve 18 becomes stronger particularly in the periphery of the oil holes 18c to 18g, and it is possible to prevent the hydraulic oil from leaking via the oil holes 18c to 18g.

As mentioned above, in accordance with the present embodiment, it is possible to install the OCV 4 to the cylinder head cover 2 at a high oil tightness. As a result, the ECU 24 can execute a hydraulic control via the OCV 4 at a high accuracy.

Figure 7:
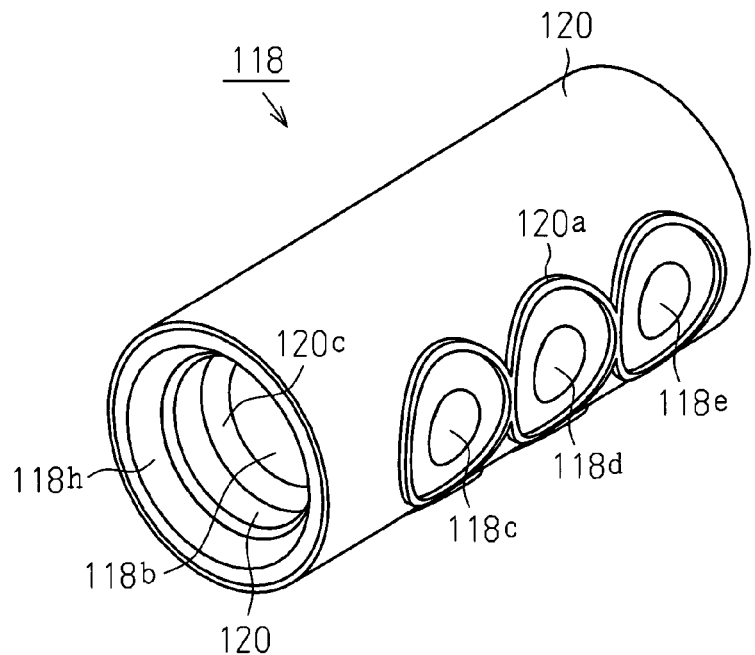
FIGS. 7(A) and 7(B) are perspective views of a sleeve in accordance with a second embodiment of the present invention in which view points are different at 90 degree from each other around an axis of the sleeve.
Figure 7:
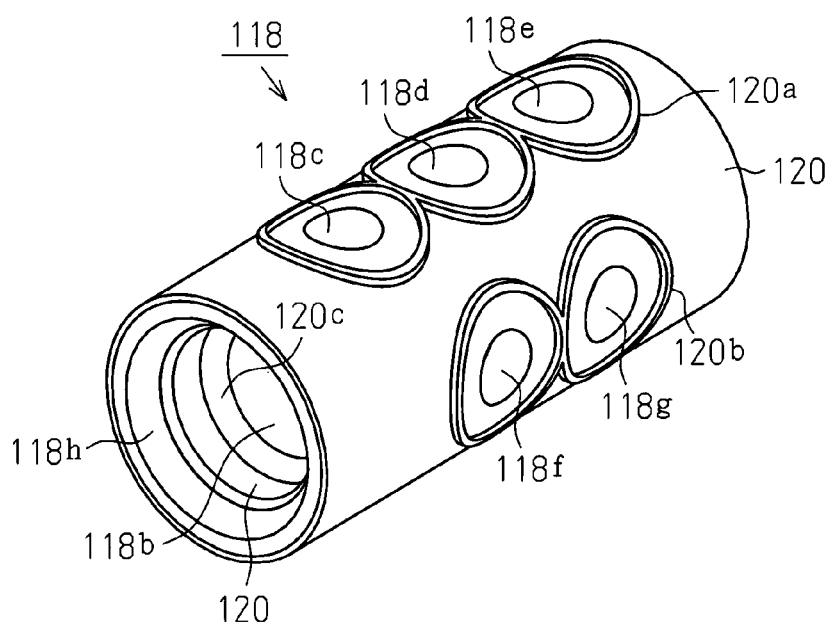
Figure 8:
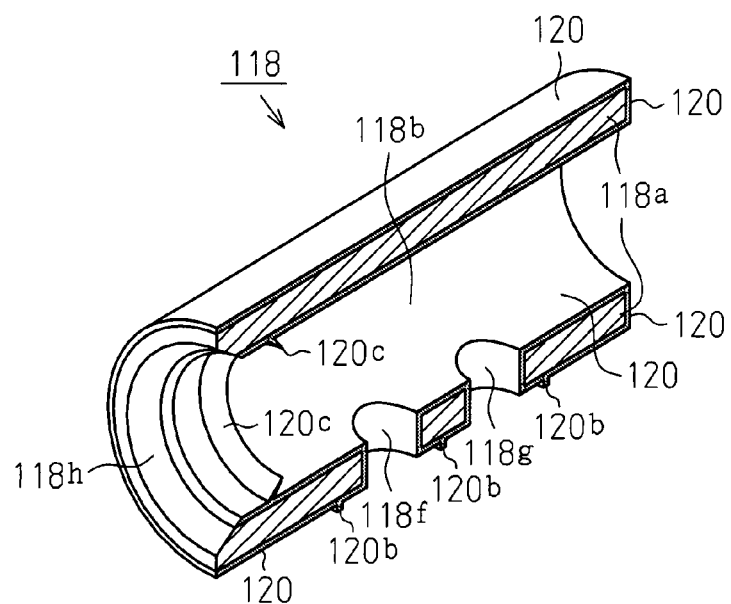
FIG. 8(A) is a broken perspective view at a vertical plane of the sleeve in the attitude in FIG. 7(A)
FIG. 8(B) is a broken perspective view at a vertical plane of the sleeve in an attitude in FIG. 7(B)
Figure 8:
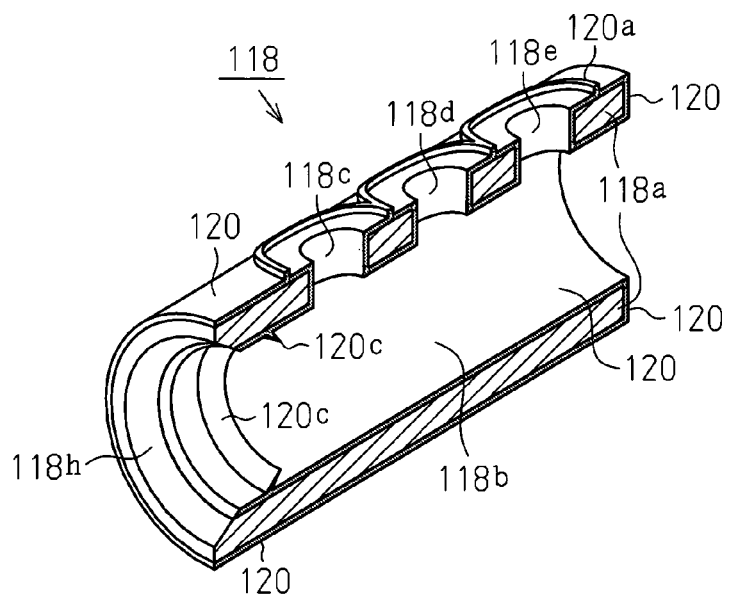
Figure 9:
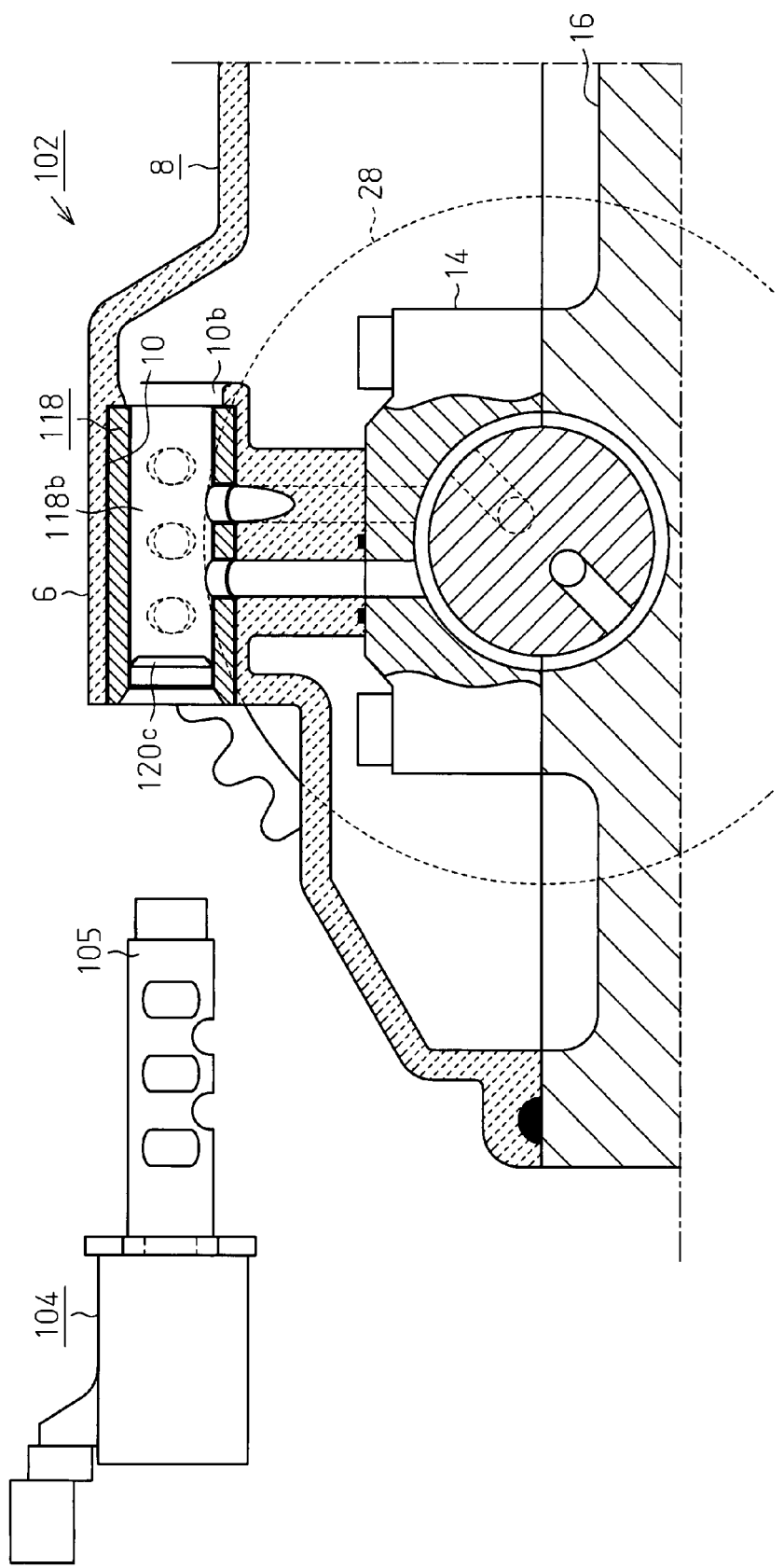
FIG. 9 is a longitudinal cross-sectional view showing a portion around an installation portion in a cylinder head cover in accordance with the second embodiment before an OCV is installed, together with the OCV.

A description will be given below of a second embodiment in accordance with the present invention with reference to FIGS. 7 to 9.

The second embodiment is substantially the same as the first embodiment except a sleeve 118. The sleeve 118 in accordance with the second embodiment is shown in FIGS. 7 and 8. A sleeve main body 118a of the sleeve 118 has the same shape as that of the sleeve main body 18a in accordance with the first embodiment, and has oil holes 118c, 118d, 118e, 118f and 118g. An outer circumferential surface of the sleeve main body 118a is covered by a rubber-like elastic body layer 120 including protrusions 120a and 120b, in the same manner as the first embodiment. The rubber-like elastic body layer 120 covers not only the outer circumferential surface of the sleeve main body 118a, but also a surface defining each of the oil holes 118c to 118g and an inner circumferential surface of the sleeve main body 118a, and covers the entire surface of the sleeve main body 118a except an end portion in the side to which the OCV 104 provided with a tapered surface 118h is inserted.

A seal lip 120c constituted by a thin rubber-like elastic body is provided in an inner periphery of an end portion of the sleeve main body 118a in the side to which the OCV 4 is inserted over the entire circumference. The seal lip 120c serves as serving as a projection, As shown in FIG. 9, the sleeve 118 is fitted to the installation hole 10 of the cover main body 8. After fitting to the installation hole 10, a spool housing 105 of the OCV 104 is inserted to an accommodation hole 118b of the sleeve 118. In the OCV 4 in accordance with the first embodiment shown in FIGS. 1 and 2, the peripheral groove is provided in the proximal end portion of the spool housing 5 and the O-ring 5f is fitted to the peripheral groove, however, no O-ring is provided in the spool housing 105 of the OCV 104 in accordance with the second embodiment.

A portion between the spool housing 105 of the OCV 104 installed to the sleeve 118 and the sleeve 118 is oil sealed by a portion of the rubber-like elastic body layer 120 covering the inner circumferential surface of the sleeve main body 118a.

Further, since a distal end of the seal lip 120c is engaged with the outer circumferential surface of the spool housing 105, it is possible to avoid leakage of the hydraulic oil to the outside of the cover main body 8 even if the hydraulic oil leaks to the portion between the spool housing 105 and the sleeve 118. That is, it is possible to prevent the hydraulic oil from leaking to the outside of the cylinder head cover 102, without setting the groove or the O-ring in the spool housing 105.

In accordance with the second embodiment described above, the following advantages are obtained in addition to the advantages obtained by the first embodiment.

Since the rubber-like elastic body layer 120 is also provided in the inner circumferential surface of the sleeve main body 118a, the spool housing 105 of the OCV 104 inserted to the accommodation hole 118b of the sleeve 118 is closely contacted to the sleeve 118. Therefore, in accordance with the present embodiment, it is possible to install the OCV 104 to the cylinder head cover 102 at a higher oil tightness.

It is possible to prevent the hydraulic oil from leaking to the outside of the cover main body 8 from the portion between the OCV 104 and the sleeve main body 118a, by the seal lip 120c provided in the sleeve 118 without setting the structure for the oil seal such as the groove or the O-ring in the OCV 104.

Accordingly, it is possible to simplify the structure of the OCV 104 and it is possible to reduce the manufacturing costs of the OCV 104.

The rubber-like elastic body layer 120 covers the entire surface of the sleeve main body 118*a* except the end portion in the side to which the OCV 104 is inserted. Accordingly, the edge of the rubber-like elastic body layer 120 is positioned only in an end portion in the side to which the OCV 104 is inserted. Therefore, it is possible to easily execute deburring of the edge of the rubber-like elastic body layer 120 which is executed as necessary after an exposure forming of the rubber-like elastic body layer 120.

In the second embodiment, the seal lip 120*c* does not need to be a thin film the thickness of which is reduced toward the distal end, but may have a cross-sectional shape that is the same as that of the protrusions 120*a* and 120*b*.

In the second embodiment, the tapered surface 118*h* of the sleeve main body 118*a* is not covered by the rubber-like elastic body layer 120, however, the tapered surface 118*h* of the sleeve main body 118*a* may be also covered by the rubber-like elastic body layer 120. Alternatively, the entire surface of the sleeve main body 118*a* may be covered by the rubber-like elastic body layer 120.

Figure 10:
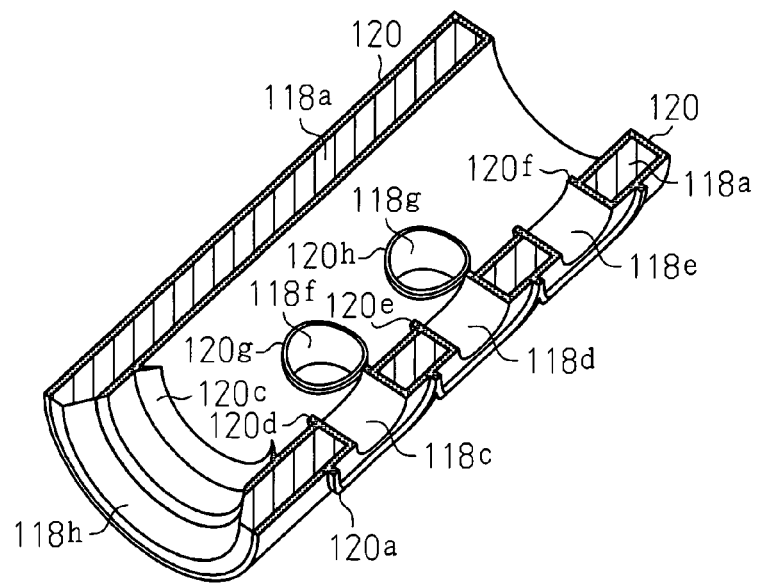
FIG. 10 is a broken perspective view of a sleeve at a horizontal surface in accordance with another embodiment of the present invention.

In the second embodiment, in addition to the provision of the protrusions 120*a* and 120*b* in the outer circumferential surface of the sleeve 118, the protrusions 120*d*, 120*e*, 120*f*, 120*g*, and 120*h* may be also provided in the inner circumferential surface of the sleeve 118, as shown in FIG. 10. The protrusions 120*d* to 120*h* correspond to a thick portion of the rubber-like elastic body layer 120, and are respectively provided around the oil holes 118*c* to 118*g* in such a manner as to surround the oil holes 118*c* to 118*g*.

Figure 11:
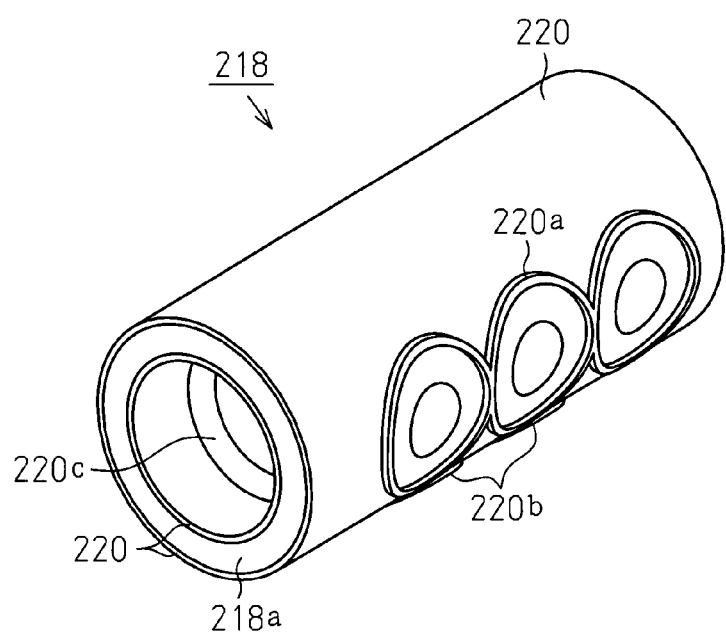
FIG. 11 is a perspective view of a sleeve in accordance with an other embodiment of the present invention.

In the first embodiment, it is possible to omit the tapered surface 18*h* which is provided in the end portion of the sleeve main body 18*a* in the side to which the OCV 4 is inserted. In the second embodiment, it is possible to omit the tapered surface 118*h* provided in the end portion of the sleeve main body 118*a* in the side to which the OCV 104 is inserted. For example, as shown in FIG. 11, no tapered surface may be provided in an end portion of a sleeve main body 218*a*. In a sleeve 218 shown in FIG. 11, an outer circumferential surface and an inner circumferential surface of the sleeve main body 218*a* are covered by a rubber-like elastic body layer 220. Further, protrusions 220*a* and 220*b* are provided in an outer circumferential surface of the sleeve 218, and a seal lip 220*c* is provided in an inner circumferential surface of the sleeve 218. If the inner diameter of the sleeve main body 218*a* is set sufficiently larger than the outer diameter of a spool housing of the OCV, insert the spool housing is easily inserted without any tapered surface. Since the rubber-like elastic body layer 220 is provided also in the inner circumferential surface of the sleeve main body 218*a*, there is no risk that an oil leakage is generated even if the inner diameter of the sleeve main body 218*a* is larger in some degree than the outer diameter of the spool housing.

In the first embodiment, the OCV 4 is arranged in the accommodation hole 18*b* of the sleeve 18 after the sleeve 18 is arranged in the installation hole 10 of the cover main body 8, however, the sleeve 18 integrally formed with the OCV 4 may be arranged in the installation hole 10 of the cover main body 8 after the OCV 4 is arranged in the accommodation hole 18*b* of the sleeve 18. In the same manner, in the second embodiment, the sleeve 118 integrally formed with the OCV 104 may be arranged in the installation hole 10 of the cover main body 8 after the OCV 104 is arranged in the accommodation hole 118*b* of the sleeve 118.

In the first and second embodiments, the cover main body 8 may be made of a resin in place of the metal. In accordance with the first and second embodiments, it is possible to install the OCV 4 or 104 to the cylinder head cover 2 or 102 at a high oil tightness even if there exists problems caused by the cover main body 8 being made of the resin, such as the poorness in the dimensional accuracy of the installation hole 10, the difference of thermal expansion rate between the OCV 4 or 104 and the cover main body 8, and the creep phenomenon.

The invention claimed is:

1. A sleeve allowing insertion of an oil control valve and being inserted, when used, to an installation hole provided in a cylinder head cover, the sleeve comprising:
    a tubular sleeve main body having an outer surface of a shape corresponding to a shape of a surface defining the installation hole, and having an inner surface of a shape corresponding to an outer surface of the control valve;
    an oil hole provided in the sleeve main body to connect an internal space of the sleeve with an outside of the sleeve so as to supply and drain a hydraulic oil between the oil control valve and an oil passage provided in the cylinder head cover; and
    an elastic body layer provided in such a manner as to cover the outer surface of the sleeve main body, said elastic body layer having a protrusion provided in the periphery of the oil hole so as to surround the oil hole.

2. The sleeve according to claim 1, wherein the sleeve main body is formed of a metal material.

3. The sleeve according to claim 2, wherein the elastic body layer is formed of a rubber resin.

4. The sleeve according to claim 3, wherein the elastic body layer is formed by baking a material for forming an elastic body.

5. The sleeve according to claim 4, wherein the elastic body layer is provided to cover the inner surface in addition to the outer surface of the sleeve main body.

6. The sleeve according to claim 3, wherein the elastic body layer is provided to cover the inner surface in addition to the outer surface of the sleeve main body.

7. The sleeve according to claim 2, wherein the elastic body layer is formed by baking a material for forming an elastic body.

8. The sleeve according to claim 7, wherein the elastic body layer is provided to cover the inner surface in addition to the outer surface of the sleeve main body.

9. The sleeve according to claim 2, wherein the elastic body layer is provided to cover the inner surface in addition to the outer surface of the sleeve main body.

10. The sleeve according to claim 1, wherein the elastic body layer is formed of a rubber resin.

11. The sleeve according to claim 10, wherein the elastic body layer is formed by baking a material for forming an elastic body.

12. The sleeve according to claim 11, wherein the elastic body layer is provided to cover the inner surface in addition to the outer surface of the sleeve main body.

13. The sleeve according to claim 10, wherein the elastic body layer is provided to cover the inner surface in addition to the outer surface of the sleeve main body.

14. The sleeve according to claim 1, wherein the elastic body layer is formed by baking a material for forming an elastic body.

15. The sleeve according to claim 14, wherein the elastic body layer is provided to cover the inner surface in addition to the outer surface of the sleeve main body.

16. The sleeve according to claim 1, wherein the elastic body layer is provided in such a manner as to cover the inner surface in addition to the outer surface of the sleeve main body.

17. The sleeve according to claim 16, wherein the elastic body layer includes a projection provided in the entire inner circumference of an end portion of the sleeve main body in the side to which the oil control valve is inserted.

18. A cylinder head cover of an internal combustion engine, wherein said cylinder head cover has an installation hole, and the sleeve according to claim 1 is arranged in said installation hole.

* * * * *